(12) United States Patent
Shou et al.

(10) Patent No.: US 6,185,102 B1
(45) Date of Patent: Feb. 6, 2001

(54) HEAT TRANSFER DEVICE

(75) Inventors: Yong Kung Shou; Feng-Yu Chiang, both of Tu-Chen (TW)

(73) Assignee: Foxconn Precision Components, Co., Ltd., Taipei Hsien (TW)

( * ) Notice: Under 35 U.S.C. 154(b), the term of this patent shall be extended for 0 days.

(21) Appl. No.: 09/450,853

(22) Filed: Nov. 29, 1999

(30) Foreign Application Priority Data

Sep. 7, 1999 (TW) ............................................. 088215295

(51) Int. Cl.⁷ ....................................................... H05K 7/20
(52) U.S. Cl. ........................... 361/704; 361/687; 361/700; 165/104.33; 165/80.4; 174/15.2; 16/223; 16/342
(58) Field of Search ...................................... 361/687, 688, 361/700, 704, 707, 699; 165/80.4, 104.33, 86; 174/15.2; 257/714, 715

(56) References Cited

U.S. PATENT DOCUMENTS

| | | | |
|---|---|---|---|
| 5,621,613 | * 4/1997 | Haley et al. | 361/687 |
| 5,764,482 | * 6/1998 | Meyer, IV et al. | 361/699 |
| 5,781,409 | * 7/1998 | Mercedy, III | 361/687 |
| 5,796,581 | * 8/1998 | Mok | 361/687 |
| 5,822,187 | * 10/1998 | Garner et al. | 361/687 |
| 5,832,987 | * 10/1998 | Lowry et al. | 165/86 |
| 5,847,925 | * 12/1998 | Progl et al. | 361/687 |
| 5,910,883 | * 6/1999 | Cipolla et al. | 361/687 |
| 6,031,716 | * 2/2000 | Cipolla et al. | 361/687 |

* cited by examiner

Primary Examiner—Leo P. Picard
Assistant Examiner—Boris L. Chervinsky
(74) Attorney, Agent, or Firm—Wei Te Chung

(57) ABSTRACT

A heat transfer device comprises a heat conductive base, first and second cylindrical chambers defined in the heat conductive base and parallel to each other, a first heat conduction pipe fixed within the first cylindrical chamber, a second heat conduction pipe pivotally received in the second cylindrical chamber, and a sealing mechanism. One end of the first heat conduction pipe is secured within the first cylindrical chamber, while the other end thereof is attached to a heat-generating electrical element for absorbing heat produced by the electrical element and then transmitting the absorbed heat to the heat conductive base. One end of the second heat conduction pipe is pivotally mounted within the second cylindrical chamber, while the other end thereof is connected to a monitor panel of the Notebook computer for dissipating the heat transmitted by the heat conductive base to the exterior of the Notebook computer via the monitor panel. A heat-conductive lubricant surrounds the end of the second heat conduction pipe within the second cylindrical chamber thereby providing heat conduction and lubrication between the pipe and the chamber.

17 Claims, 2 Drawing Sheets

HEAT TRANSFER DEVICE

BACKGROUND OF THE INVENTION

The present invention relates to a heat transfer device, and particularly to a heat transfer device which is pivotally assembled in a Notebook type computer for transmitting heat produced by the CPU of the Notebook type computer to the monitor thereof.

PRIOR ART DESCRIPTION

As the computing speed and the power capacity of electrical chips increases, the heat produced by the electrical chips increases. Heat transfer devices directly mounted to the surface of an electrical chip are commonly used for dissipating heat produced, thereby keeping the temperature of the chip within its operating range. U.S. Pat. Nos. 5,615,735; 5,537,343 and 5,541,811 disclose heat transfer devices which are directly attached on a mother board. Such heat transmitting elements dissipate the heat produced by an electrical chip, such as a central processing unit (CPU), mounted on the mother board, through heat conductive fin-like members. However, in practice, such heat transmitting elements are not efficient and can not meet increasingly higher requirements for dissipating heat.

U.S. Pat. No. 5,690,468 discloses another type of heat transfer device. This heat transfer device comprises a heat dissipating portion, a heat conduction pipe and a fan. The heat dissipating portion includes a rectangular base and a plurality of heat dissipating fins integrally extending upward from an upper surface of the base. The bottom surface of the base is closely attached to an electrical chip. The fan is mounted in the center of the upper surface of the base. The heat conduction pipes are fixed among heat dissipating fins formed on a lateral side of the base. This kind of heat transfer device is superior in heat dissipating efficiency. However, since a Notebook computer is strictly limited by a height requirement, this kind of heat transfer device is not suitable for use in a Notebook computer because of the device's bulky body.

Furthermore, the prior art heat transfer devices discussed above all dissipate heat through the Notebook computer's mother board, on which the electrical chips are mounted. For a Notebook computer user, this can be painful and unsustainable if the user operates the Notebook computer from his/her lap.

Accordingly, an improved heat transfer device is desired.

BRIEF SUMMARY OF THE INVENTION

A main object of the present invention is to provide a heat transfer device which is pivotally mounted to a Notebook computer and which efficiently dissipates heat produced by electrical chips in the Notebook computer.

Another object of the present invention is to provide a heat transfer device which dissipates heat produced by the electrical chips in a Notebook computer through a monitor panel of the Notebook computer.

A heat transfer device in accordance with the present invention comprises a heat conductive base, first and second cylindrical chambers defined in the heat conductive base and parallel to each other, a first heat conduction pipe fixed within the first cylindrical chamber, a second heat conduction pipe pivotally received in the second cylindrical chamber, and a sealing mechanism. One end of the first heat conduction pipe is secured within the first cylindrical chamber, while the other end thereof is attached to a heat-generating electrical element for absorbing heat produced by the electrical element and then transmitting the absorbed heat to the heat conductive base. One end of the second heat conduction pipe is pivotally mounted within the second cylindrical chamber, while the other end thereof is connected to a monitor panel of the Notebook computer for dissipating the heat transmitted by the heat conductive base to the exterior of the Notebook computer via the monitor panel. A heat-conductive lubricant surrounds the end of the second heat conduction pipe in the second cylindrical chamber thereby providing heat conduction and lubrication between the pipe and the chamber.

Other objects, advantages and novel features of the invention will become more apparent from the following detailed description when taken in conjunction with the accompanying drawings.

DETAILED DESCRIPTION OF THE INVENTION

Figure 1:
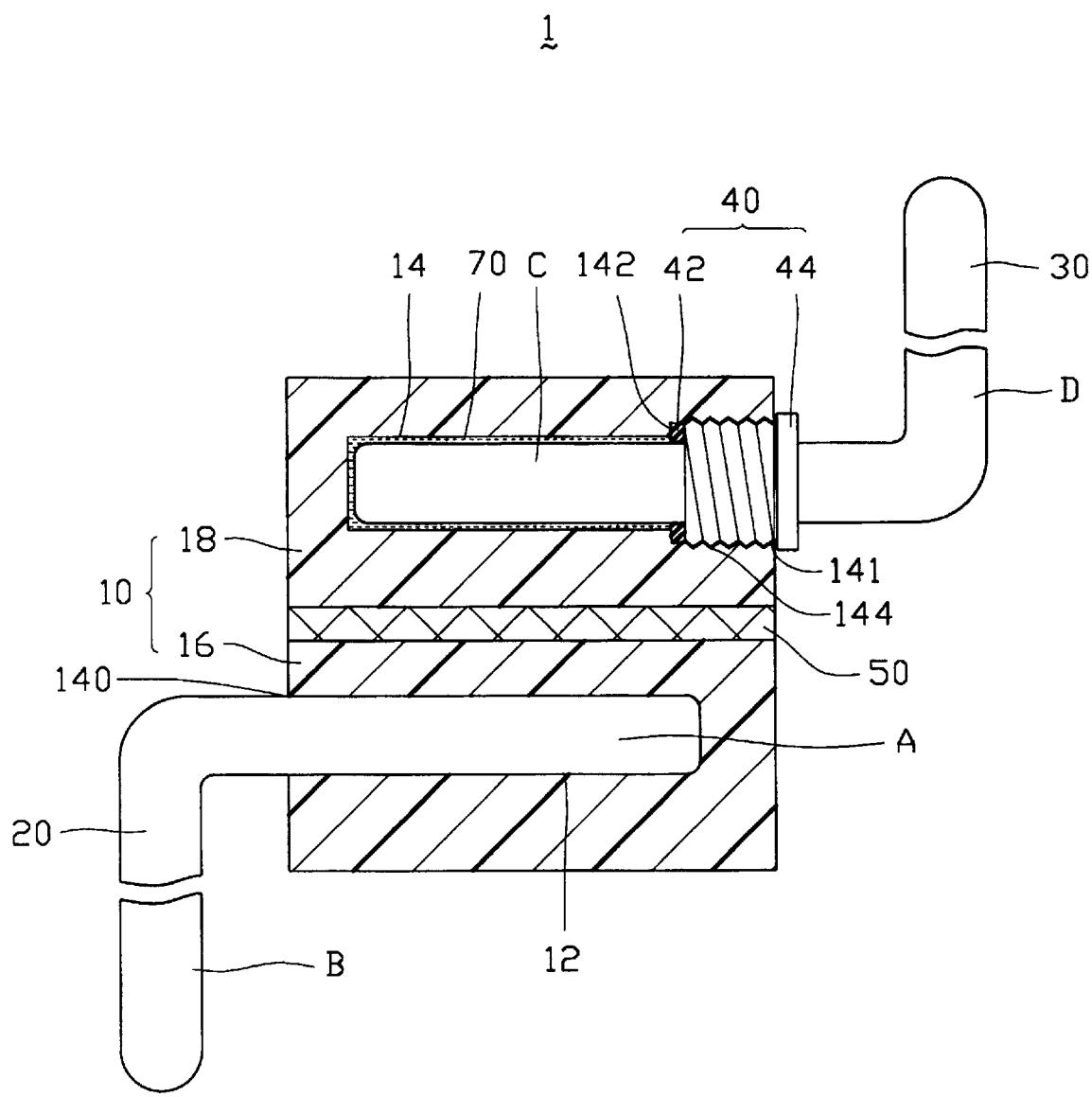
FIG. 1 is a cross-sectional view of a heat transfer device in accordance with the present invention.
Figure 2:
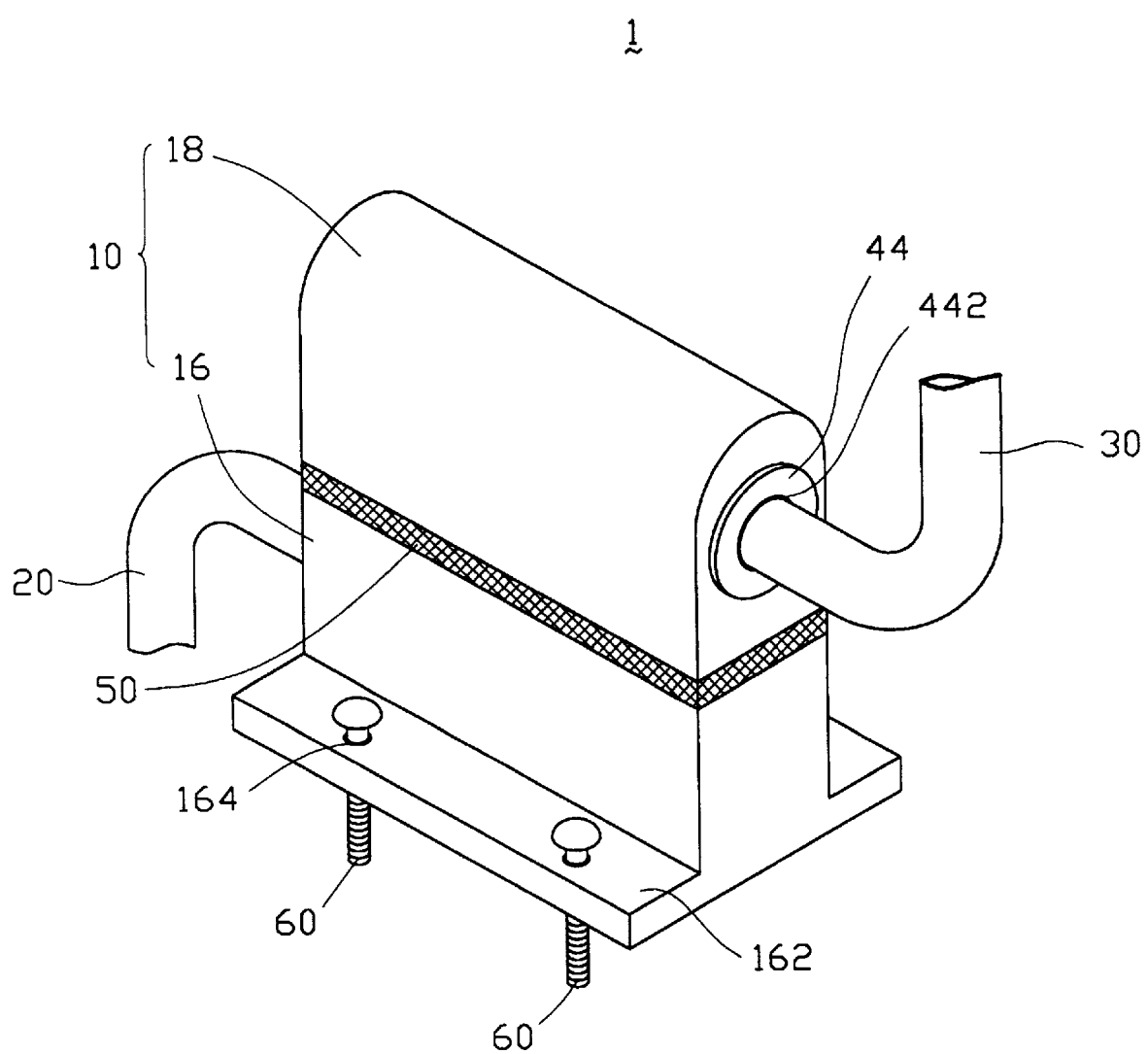
FIG. 2 is a perspective view of the heat transfer device of FIG. 1.

Referring to FIGS. 1 and 2, a pivotable heat transfer device 1 in accordance with the present invention comprises a heat conductive base 10, first and second heat conduction pipes 20, 30 mounted to the heat conductive base 10, and a sealing mechanism 40 mounted on the heat conductive base 10.

The heat conductive base 10 includes upper and lower members 18, 16 aligning with each other in a vertical overlapping relationship. The upper and lower members 18 and 16 are glued together using a heat conductive adhesive 50. A first cylindrical chamber 12 is defined in the lower member 16 for securely receiving one end "A" of the first heat conduction pipe 20 therein. A second cylindrical chamber 14 is defined in the upper member 18 and parallel to the first cylindrical chamber 12 for receiving one end of the second heat conduction pipe 30. The first and second chambers 12, 14 have first and second openings 140, 141 at opposite sides of the base 10, respectively. A step 142 is formed in the second chamber 14 near the second opening 141. A few screw threads are formed in the inner surface of the second chamber 14 near the second opening 141. The lower member 16 forms a pair of laterally extending wing plates 162. A pair of screw holes 164 is defined in opposite corners of each wing plate 162 for securing the base 10 onto a mother board (not shown) via corresponding bolts 60.

The end "A" of the first heat conduction pipe 20 is fixed within the first chamber 12 of the base 10, while the other end "B" of the first heat conduction pipe 20 is connected to a corresponding electrical element (not shown), such as a central processing unit (CPU), for transmitting the heat produced by the CPU to the heat conductive base 10. The end "A" of the first heat conduction pipe 20 is perpendicular to the end "B". One end "C" of the second heat conduction pipe 30 is pivotally received within the second chamber 14 of the base 10, while the other end "D" thereof is connected to a monitor panel (not shown) of the Notebook computer for transmitting the heat absorbed from the heat conductive base 10 to the exterior of the Notebook via the monitor panel.

A heat-conductive lubricant 70 surrounds the end "C" of the second heat conduction pipe 30 in the second cylindrical chamber 14 thereby providing heat conduction and lubrication between the second heat conduction pipe 30 and the second chamber 14. The sealing mechanism 40 is secured in the second opening 141 of the second chamber 14 of the base 10 thereby sealing the lubricant 70 within the second chamber 14. The sealing mechanism 40 comprises a sealing ring 42 and a threaded plug 44. The threaded plug 44 could also be replaced with a rubber plug and other suitable members to seal the second chamber 14. The sealing ring 42 is positioned to abut against the step 142 of the second chamber 14. The threaded plug 44 is screwed into the second opening 141 via the screw threads 144, while the second heat conduction pipe 30 extends through the sealing ring 42 and an aperture 442 defined in the threaded plug 44. Thus, the sealing mechanism 40 effectively seals the lubricant 70 within the second chamber 14, and the second heat conduction pipe 30 can still move pivotally with the end "C" thereof received in the second chamber 14 and extending through the sealing mechanism 40.

Therefore, when the heat transfer device 1 is positioned in the Notebook computer, the end "B" of the first heat transmitting pipe 20 is attached to a heat-generating electrical element, for example, the CPU, to absorb the heat produced by the element and to simultaneously transmit the absorbed heat to the heat conductive base 10 via the other end "A" secured within the lower member 16. The lower member 16 then conducts the absorbed heat to the upper member 18 through the conductive adhesive 50. The end "C" of the second heat conduction pipe 30 then absorbs the heat from the upper member 18 via the heat conductive lubricant 70 and conducts it to the other end "D" thereof. The heat is then dissipated to the exterior of the Notebook via heat exchanges between the end "D" of the second heat conduction pipe 30 and the monitor panel of the Notebook computer. It should be noted that all materials used in the heat transfer device 1 are made of heat conductive materials, thereby ensuring efficient heat dissipation therethrough.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heat transfer device mounted in an electronic device having a pivotally connected monitor panel, the heat transfer device comprising:
    a heat conductive base secured in said electronic device and forming a first and a second cylindrical chambers aligned with each other, said first and second cylindrical chambers defining first and second openings opened to an exterior space on opposite sides of the heat conductive base respectively;
    a first heat conduction pipe having an end extending into and secured within the first cylindrical chamber of the heat conductive base and another end adapted to absorb heat; and
    a second heat conduction pipe having an end extending into and pivotally received in the second cylindrical chamber of the heat conductive base;
    wherein said second cylindrical chamber is filled with a heat-conductive lubricant such that said second heat conduction pipe is substantially surrounded by said lubricant thereby increasing heat-transfer between said heat conductive base and said second heat conduction pipe.

2. The heat transfer device as claimed in claim 1, wherein a step is formed in the second cylindrical chamber near the second opening thereof.

3. The heat transfer device as claimed in claim 2, wherein a few screw threads are formed in an inner surface of the second cylindrical chamber near the second opening thereof.

4. The heat transfer device as claimed in claim 1, wherein a sealing mechanism is provided to seal the heat-conductive lubricant within the second cylindrical chamber of the heat conductive base.

5. The heat transfer device as claimed in claim 4, wherein the sealing mechanism includes a threaded plug screwed to the screw threads of the second cylindrical chamber.

6. The heat transfer device as claimed in claim 5, wherein the plug of the sealing mechanism is made of rubber.

7. The heat transfer device as claimed in claim 5, wherein the sealing mechanism includes a sealing ring between the step of the second chamber and the plug.

8. The heat transfer device as claimed in claim 1, wherein the heat conductive base includes upper and lower members glued together by a heat conductive adhesive layer.

9. The heat transfer device as claimed in claim 8, wherein the first cylindrical chamber is defined in the lower member, and wherein the second cylindrical chamber is defined in the upper member.

10. The heat transfer device as claimed in claim 1, wherein the end of the first heat conductive pipe secured within the first cylindrical chamber of the heat conductive base is perpendicular to the other end thereof.

11. The heat transfer device as claimed in claim 1, wherein the end of the second heat conductive pipe received in the second chamber of the heat conductive base is perpendicular to the other end thereof.

12. A method for dissipating heat from a CPU in a computer case, comprising the steps of:
    providing a heat conductive base forming a first and a second cylindrical chambers aligned with each other, said first and second cylindrical chambers defining first and second openings opened to an exterior space on opposite sides of the heat conductive base respectively;
    providing a first heat conduction pipe having an end extending into and secured within the first cylindrical chamber of the heat conductive base and another end absorbing heat;
    providing a second heat conduction pipe having an end extending into and pivotally received in the second cylindrical chamber of the heat conductive base for absorbing heat from the first conductive pipe; and
    providing a heat-conductive lubricant in said second cylindrical chamber such that said second heat conduction pipe is substantially surrounded by said lubricant thereby increasing heat-transfer between said heat conductive base and said second heat conduction pipe.

13. The method as claimed in claim 12, wherein said first heat conduction pipe transfers heat to the second heat conduction pipe through said base.

14. The method as claimed in claim 13, wherein said base includes a lower portion and an upper portion stackably joined with each other via heat conductive adhesives, and the second end of the first heat conduction pipe and the second end of the second heat conduction pipe respectively received therein.

15. A beat transfer device assembly for transferring heat generated from a CPU within a computer case to a monitor pivotally externally mounted to said computer case, comprising:

a base;

a first heat conduction pipe defining thereof a first end and a second end positioned around the base; and a second heat conduction pipe defining thereof a first end and a second end pivotally positioned around the base;

wherein said second end of the first heat conduction pipe is very close to the second end of the second heat conduction pipe, and heat exchange occurs therebetween;

wherein a heat conductive lubricant is filled between said second end of said second heat conduction pipe and said base.

16. The assembly as claimed in claim 15, wherein said second end of the first heat conduction pipe and the second end of the second heat conduction pipe are overlapped with each other in a vertical direction, and said heat exchange is implemented through portions of said base between said second end of the first heat conduction pipe and said second end of the second heat conduction pipe.

17. The assembly as claimed in claim 16, wherein said base includes a lower portion and an upper portion respectively receiving the corresponding second end of the first heat conduction pipe and the second end of the second heat conduction pipe, and with heat conductive adhesives therebetween.

* * * * *